(12) United States Patent
Hung

(10) Patent No.: US 11,216,283 B2
(45) Date of Patent: Jan. 4, 2022

(54) PARAMETER CONFIGURATION SYSTEM OF ELECTRONIC DEVICE

(71) Applicant: Chiun Mai Communication Systems, Inc., New Taipei (TW)

(72) Inventor: Yu-Hua Hung, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 289 days.

(21) Appl. No.: 16/452,658

(22) Filed: Jun. 26, 2019

(65) Prior Publication Data
US 2019/0391824 A1 Dec. 26, 2019

(30) Foreign Application Priority Data
Jun. 26, 2018 (CN) .......................... 201810672281.3

(51) Int. Cl.
*G06F 9/445* (2018.01)
(52) U.S. Cl.
CPC ...... *G06F 9/44505* (2013.01); *G06F 9/44578* (2013.01)
(58) Field of Classification Search
CPC .................. G06F 9/44505; G06F 9/44578
See application file for complete search history.

(56) References Cited

U.S. PATENT DOCUMENTS

| 8,046,575 | B2* | 10/2011 | Lin ..................... G06F 11/1417 713/2 |
| 8,725,996 | B2* | 5/2014 | Freese ................... G06F 9/4403 713/2 |
| 9,838,971 | B1* | 12/2017 | Liu ........................ G06F 1/3206 |
| 2005/0204125 | A1* | 9/2005 | Chin ...................... G06F 9/4411 713/100 |
| 2012/0258722 | A1* | 10/2012 | Liu ........................ G06F 9/5022 455/450 |
| 2013/0024814 | A1* | 1/2013 | Kim .................... G06F 3/04817 715/810 |
| 2013/0278224 | A1* | 10/2013 | Ofek ....................... H02M 1/12 320/137 |

(Continued)

FOREIGN PATENT DOCUMENTS

| CN | 104050035 | 9/2014 |
| CN | 105278811 | 1/2016 |

(Continued)

*Primary Examiner* — Jaweed A Abbaszadeh
*Assistant Examiner* — Gayathri Sampath
(74) *Attorney, Agent, or Firm* — ScienBiziP, P.C.

(57) ABSTRACT

An operation parameter configuration method includes configuring at least two groups of operation parameters of an application, detecting a startup signal of the application in real time, confirming one of the at least two groups of operation parameters according to the startup signal, and starting the application in a foreground of the electronic device according to one confirmed group of operation parameters. The at least two groups of operation parameters include a group of default operation parameters and a group of optimal operation parameters. The group of optimal operation parameters are calculated according to a history of execution of the application by an electronic device. The group of optimal operation parameters is calculated according to a history of execution of the application in the foreground of the electronic device.

19 Claims, 8 Drawing Sheets

(56) References Cited

U.S. PATENT DOCUMENTS

| | | | |
|---|---|---|---|
| 2014/0137080 A1 | 5/2014 | Huang et al. | |
| 2015/0100801 A1* | 4/2015 | Maity | G06F 1/3206 713/320 |
| 2016/0291989 A1* | 10/2016 | Spitzer | G06F 8/77 |
| 2017/0199745 A1* | 7/2017 | Liu | G06F 9/44505 |

FOREIGN PATENT DOCUMENTS

| | | |
|---|---|---|
| CN | 106292990 | 1/2017 |
| TW | 201437964 | 10/2014 |
| TW | 201716926 | 5/2017 |
| TW | I612467 | 1/2018 |

\* cited by examiner

| Application name | Time | Record of operation parameters ||| Optimal operation parameters |
|---|---|---|---|---|---|
| | | Processing frequency (MHz) | Maximum temperature | Maximum storage space | |
| Application "A1" | 2018/1/1 9:05am | 1200 | 55 | 256 | 1. Processing frequency: 1300 MHz; 2. Maximum temperature:50℃; 3. Maximum storage space: 384MB |
| | 2018/1/1 9:15am | 1400 | 45 | 512 | |
| Application "A2" | 2018/1/1 10:15am | 1000 | 55 | 512 | 1. Processing frequency: 1000 MHz; 2. Maximum temperature:55℃; 3. Maximum storage space: 512MB |
| Application "A3" | 2018/1/6 10:00am | 1200 | 55 | 256 | 1. Processing frequency: 1200 MHz; 2. Maximum temperature:55℃; 3. Maximum storage space: 256MB |

FIG. 7

PARAMETER CONFIGURATION SYSTEM OF ELECTRONIC DEVICE

FIELD

The subject matter herein generally relates to electronic devices, and more particularly to a parameter configuration system for configuring operation parameters of an application in an electronic device.

BACKGROUND

Electronic devices generally have installed therein multiple applications of varying functions. Each of the applications may have different operation parameters, such as processing frequency, storage space, and the like. A parameter configuration system for configuring the operation parameters of multiple applications in the electronic device is disclosed herein.

BRIEF DESCRIPTION OF THE DRAWINGS

Implementations of the present disclosure will now be described, by way of example only, with reference to the attached figures.

FIG. 7 is a diagram of a record of operation parameters of applications according to time of receiving the operation parameters.

DETAILED DESCRIPTION

Figure 1:
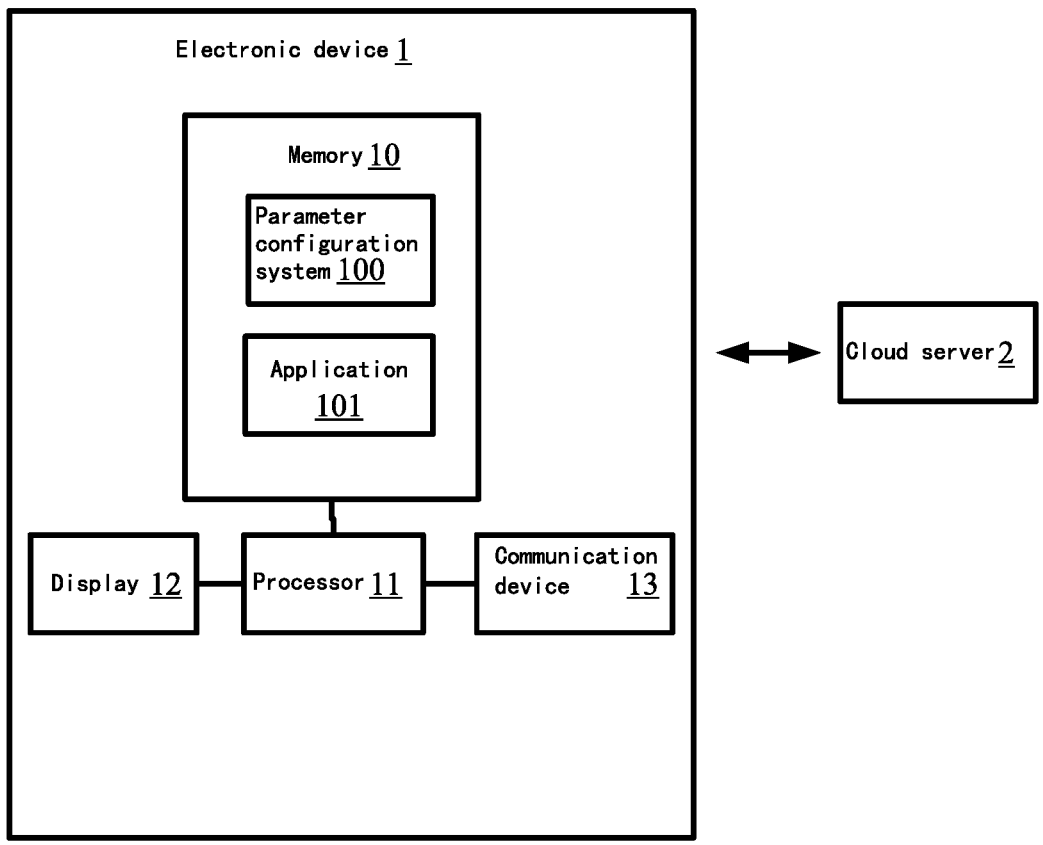
FIG. 1 is a block diagram of an embodiment of an electronic device in communication with a cloud server, the electronic device implementing a parameter configuration system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows an embodiment of an electronic device 1 in communication with a cloud server 2. The electronic device 1 may be a gaming console, a mobile phone, a tablet computer, or the like. In one embodiment, the electronic device 1 includes, but is not limited to, a memory 10, a processor 11, a display 12, and a communication device 13.

In one embodiment, the communication device 13 may be a wired or wireless communication device, such as WIFI, 2G, 3G, or 4G communication device. The electronic device 1 uses the communication device 13 to establish communication with the cloud server 2.

The display 12 may be a touch display.

In one embodiment, the memory 10 stores a plurality of program and a plurality of data, such as a parameter configuration system 100 and at least one application 101.

The memory 10 may include, but is not limited to, a read-only memory, a random access memory, a programmable read-only memory, an erasable programmable read-only memory, a one-time programmable read-only memory, an electrically-erasable programmable read-only memory, an electrically-erasable programmable read-only memory, a compact disc read-only memory, or other optical storage disk, magnetic storage disc, or magnetic storage tape.

The processor 11 may be a central processing unit, a microprocessing unit, a graphics processing unit, or other data processing chip. The processor 11 executes functions of a plurality of instructions of the parameter configuration system 100.

The electronic device 1 may have installed therein a plurality of applications 101 of different types, such as a gaming application, a music application, a video streaming application, a chat application, or the like.

Operation parameters of the at least one application 101 include, but are not limited to, a processing frequency, a maximum temperature, and a maximum storage space. The processing frequency refers to a clock frequency of the processor 11. The maximum temperature refers to a temperature of the processor 11 corresponding to downclocking the processor 11. When the processor 11 reaches the maximum temperature, the processor 11 is caused to downclock. The maximum storage space refers to a largest storage space allowed for running the at least one application 101.

Figure 2:
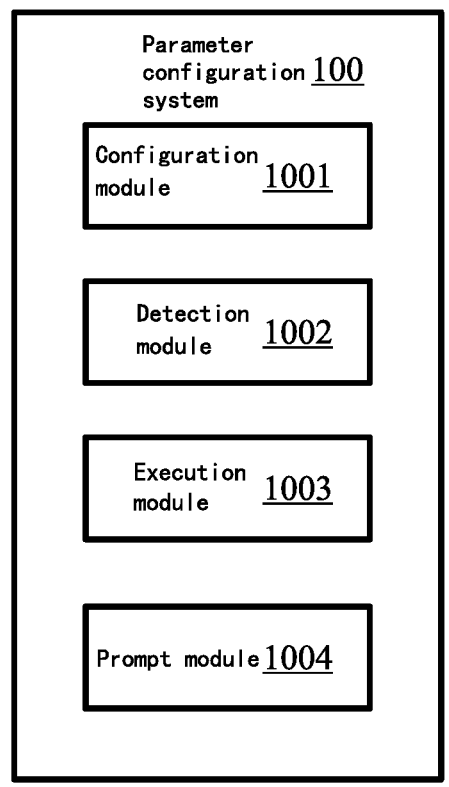
FIG. 2 is a block diagram of function modules of the parameter configuration system in FIG. 1.

In one embodiment, the parameter configuration system 100 includes a plurality of modules stored in the memory 10 and executed by the processor 11. As shown in FIG. 2, the plurality of modules includes a configuration module 1001, a detection module 1002, an execution module 1003, and a prompt module 1004.

Figure 3:
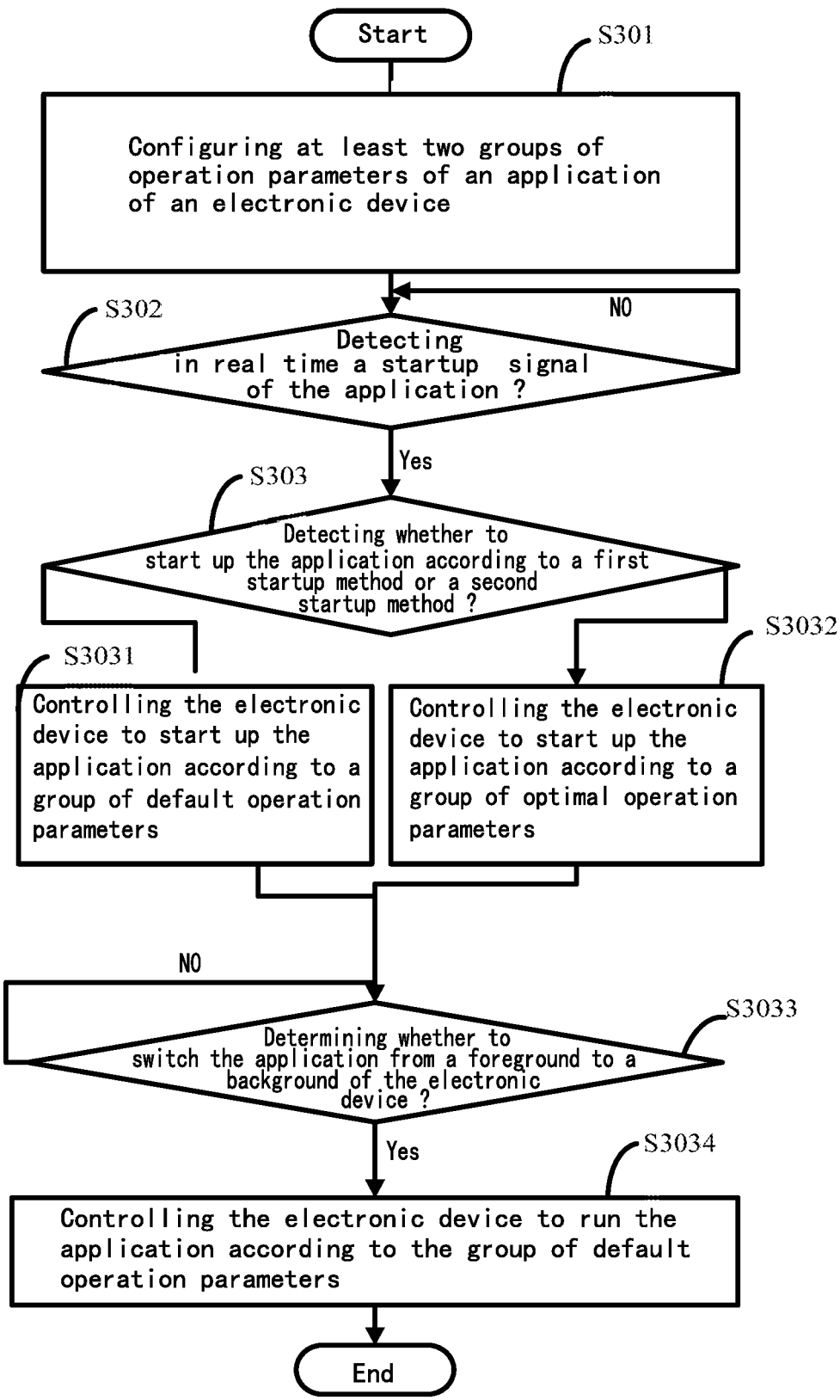
FIG. 3 is a flowchart of a parameter configuration method for configuring operation parameters of an application.

FIG. 3 illustrates a flowchart of a parameter configuration method for configuring operation parameters of an application. The method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S301.

At block S301, the configuration module 1001 configures at least two groups of operation parameters of the at least one application 101.

In one embodiment, each group of operation parameters include, but are not limited, the processing frequency, the maximum temperature, and the maximum storage space.

In one embodiment, the at least two groups of operation parameters include, but are not limited to, a group of default operation parameters and a group of optimal operation parameters.

In one embodiment, the group of default operation parameters is set by a manufacturer of the electronic device 1, and the group of optimal operation parameters is calculated according to the operation parameters of the at least one application running in a foreground of the electronic device 1.

In one embodiment, when the electronic device 1 has installed therein a plurality of applications 101, the configuration module 1001 configures the at least two groups of operation parameters for each application 101.

In one embodiment, when the electronic device 1 has installed therein a plurality of applications 101, the group of default operation parameters of each application is the same.

For example, when the electronic device 1 has installed therein a plurality of applications 101, each application 101 includes the following default operation parameters: 1200 megahertz (MHz) processing frequency, 55 degrees C. maximum temperature, 256 MB maximum storage space.

At block S302, the detection module 1002 detects a startup signal of at least one application 101 in real time.

In one embodiment, the startup signal of the at least one application 101 refers to a touch signal applied on an icon of the application 101 on the display 12.

At block S303, the detection module 1002 detects whether to start up the at least one application 101 according to a first startup method or a second startup method according to the detected startup signal of the at least one application 101.

The first startup method refers to starting up the at least one application 101 in the foreground of the electronic device 1 according to the group of default operation parameters. The second startup method refers to starting up the at least one application 101 in the foreground of the electronic device 1 according to the group of optimal operation parameters. In one embodiment, when the startup signal is a single touch signal, the detection module 1002 determines to start up the at least one application 101 according to the first startup method, and block S3031 is implemented. When the startup signal is a continual touch signal, the detection module 1002 determines to start up the at least one application 101 according to the second startup method, and block S3032 is implemented.

The single touch signal refers to a touch signal lasting less than a predetermined time duration, such as 0.5 seconds. The continual touch signal refers to a touch signal lasting longer than or equal to the predetermined time duration.

At block S3031, the execution module 1003 controls the electronic device 1 to start up the at least one application 101 according to the group of default operation parameters. The execution module 1003 sends the group of default operation parameters to the cloud server 2 so that the cloud server 2 can obtain the default operation parameters of the at least one application 101.

For example, the group of default operation parameters are 1200 MHz, 55 degrees C., and 256 MB. The execution module 1003 sends the group of default operation parameters to the cloud server 2.

At block S3032, the execution module 1003 controls the electronic device 1 to start up the at least one application 101 according to the group of optimal operation parameters. The execution module 1003 sends the group of optimal operation parameters to the cloud server 2 so that the cloud server 2 can obtain the optimal operation parameters of the at least one application 101.

In one embodiment, when the second startup method is determined, the prompt module 1004 generates a selection button. If a user selects the selection button, the second startup method is confirmed to be used to start up the at least one application 101, and the execution module 1003 controls the electronic device 1 to start up the at least one application 101 according to the group of optimal operation parameters. In one embodiment, in addition to generating the selection button, the prompt module 1004 may generate another selection button. The other selection button may correspond to other functions of the at least one application 101. For example, the other functions may correspond to adjusting a font size, setting a language, or the like.

Figure 6A:
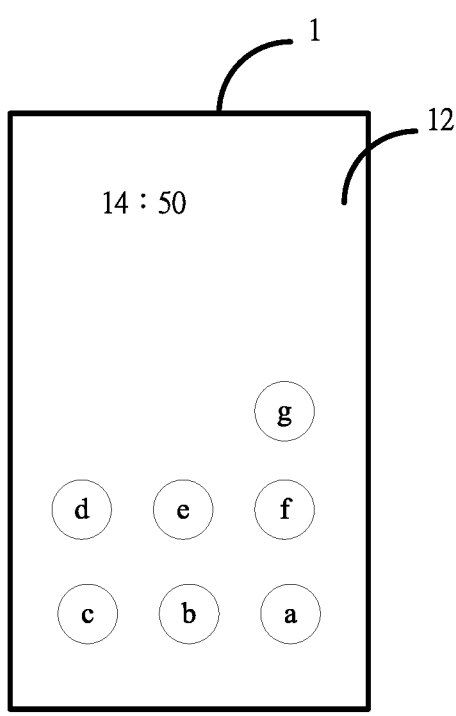
FIGS. 6A-6C are a diagram of a display of the electronic device displaying icons of a plurality of applications and selecting an application to run.
Figure 6B:
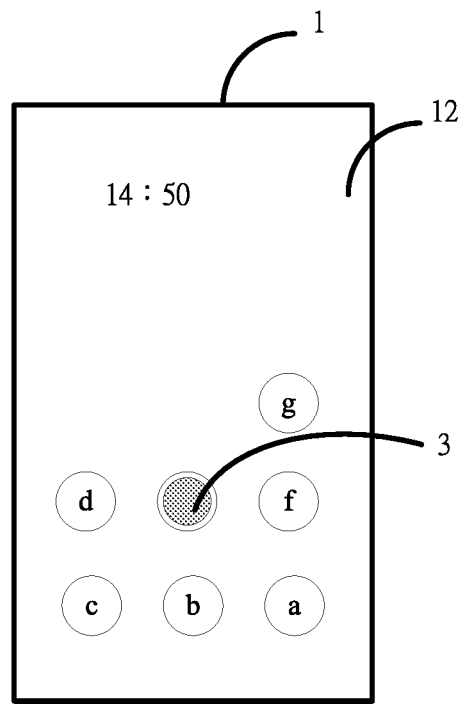
Figure 6C:
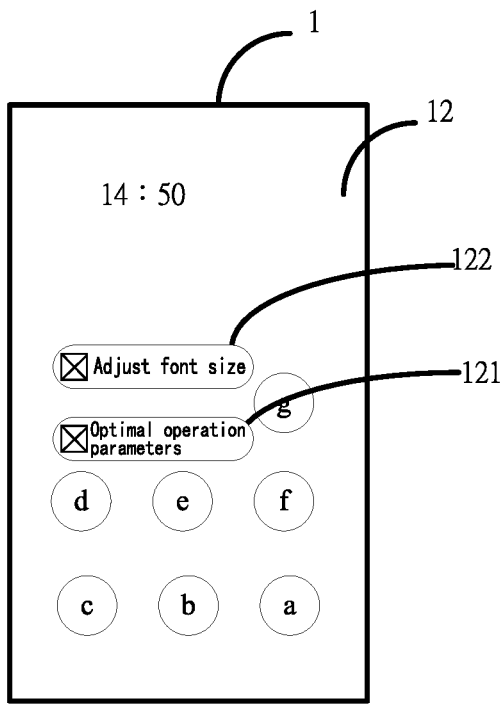

For example, as shown in FIG. 6A, the display 12 displays seven icons of applications 101, such as icons "a" to "g". As shown in FIGS. 6B and 6C, a user applies a continual touch gesture on the icon "e", and the prompt module 1004 displays a selection button 121 corresponding to the second startup method. The prompt module 1004 further displays another selection button 122 corresponding to a function of the at least one application 101 to adjust a font size. If a user selects the selection button 121, the user confirms to run the at least one application 101 in the second startup method, and the execution module 1003 controls the electronic device 1 to run the at least one application 101 according to the group of optimal operation parameters.

In another embodiment, when the user applies the continual touch gesture on the icon of the at least one application 101, the execution module 1003 directly controls the electronic device 1 to run the at least one application 101 in the second startup method without the prompt module 1004 displaying the selection button 121 on the display 12.

Referring to FIG. 3, at block S3033, the execution module 1003 determines whether to switch the at least one application 101 from the foreground to a background of the electronic device 1. When the execution module 1003 determines to switch the application 101 from the foreground to the background, block S3034 is implemented.

In one embodiment, the detection module 1002 determines to switch the at least one application 101 from the foreground to the background in response to a switching signal. The switching signal may be a touch signal applied on a home button of the electronic device or a touch signal applied on an icon of another application 101 to run the other application 101.

At block S3034, the execution module 1003 controls the electronic device 1 to run the at least one application 101 according to the group of default operation parameters.

For example, the default operation parameters of the application "A1" are 1200 MHz, 55 degrees C., and 256 MB, and the optimal operation parameters of the application "A2" are 1000 MHz, 50 degrees C., and 512 MB. When the execution module 1003 switches the application "A1" from the foreground to the background and runs the application "A2" in the foreground according to the group of optimal operation parameters, the execution module 1003 runs the application "A1" in the background according to the operation parameters 1000 MHz, 50 degrees C., and 256 MB. The application "A1" is run in the background with the same processing frequency and the same maximum temperature as the application "A2" run in the foreground. In other words, the processing frequency and the maximum temperature parameters are the same for the applications run in the foreground and the background. The electronic device 1 runs the application "A1" in the background according to a portion of the group of default operation parameters and according to the maximum storage space.

Figure 4:
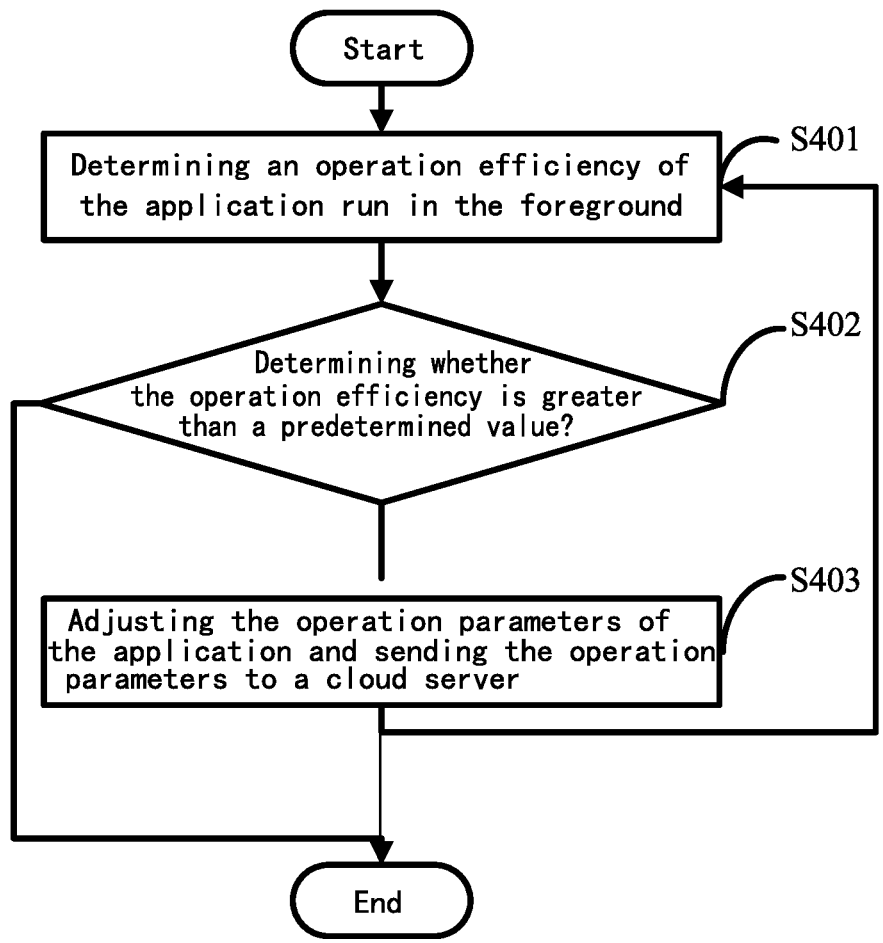
FIG. 4 is a flowchart of a method of adjusting operation parameters of an application.

FIG. 4 illustrates a flowchart of a method of adjusting operation parameters of an application. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S401.

At block S401, when the at least one application 101 is running in the foreground of the electronic device 1, the execution module 1003 determines an operation efficiency of the application 101 running in the foreground.

In one embodiment, the operation efficiency is determined according to a frames per second (FPS) parameter of the at least one application 101.

At block S402, the execution module 1003 determines whether the operation efficiency is greater than a predetermined value. When the operation efficiency is less than or equal to the predetermined value, block S403 is implemented. When the operation efficiency is greater than the predetermined value, the process is ended.

In one embodiment, the predetermined value is 30 FPS.

At block 403, the execution module 1003 adjusts the operation parameters of the at least one application 101 and sends the operation parameters to the cloud server 2.

For example, the processor 11 supports a processing frequency of 200 MHz-1400 MHz, and the application "A1" is currently running with a processing frequency of 1200 MHz. When the execution module 1003 determines that the operation efficiency of the application "A1" is less than the predetermined value, the execution module 1003 can adjust the processing frequency of the processor 11 to 1400 MHz and send the adjusted processing frequency to the cloud server 2 so that the cloud server 2 records the adjusted processing frequency of the application "A1" running in the foreground.

In one embodiment, after the execution module 1003 adjusts the processing frequency of the processor 11, block S401 is repeated, and the execution module 1003 determines whether the operation efficiency is greater than the predetermined value.

If the execution module 1003 determines that the operation efficiency of the application 101 is still less than or equal to the predetermined value, since the operation efficiency is already the maximum operation efficiency (1400 MHz), the operation efficiency is not adjusted further. Instead, the maximum temperature and the maximum storage space are adjusted. The execution module 1003 can increase the maximum temperature and the maximum storage space to improve the operation efficiency and send the adjusted maximum temperature and the adjusted maximum storage space to the cloud server 2.

Figure 5:
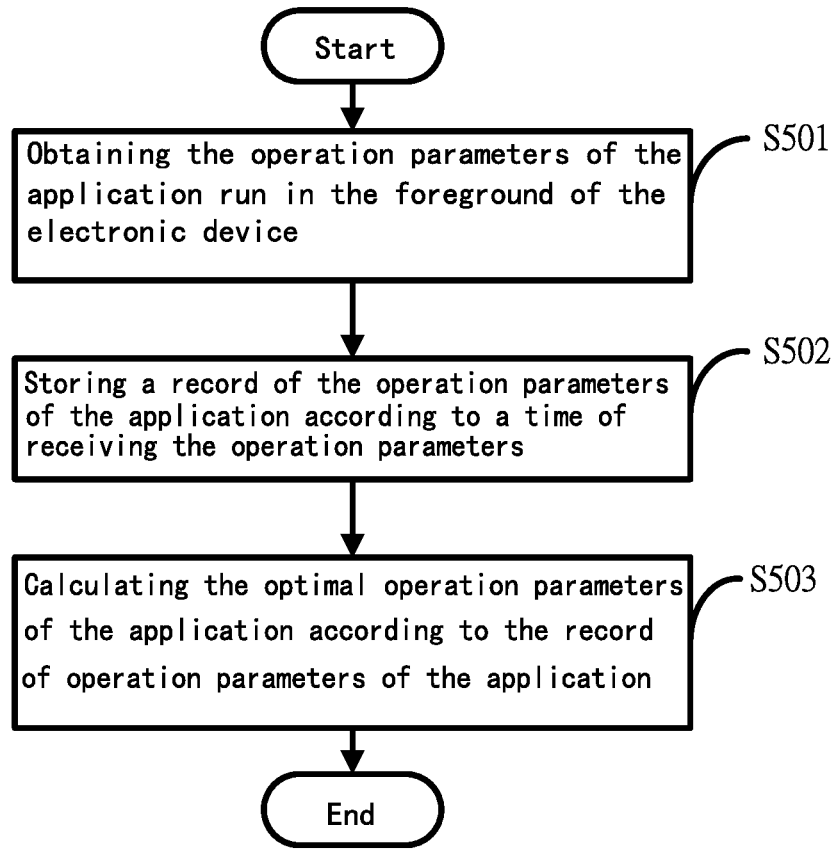
FIG. 5 is a flowchart of a method of calculating optimal operation parameters of an application.

FIG. 5 illustrates a flowchart of a method of calculating optimal operation parameters of an application. The method is provided by way of example, as there are a variety of ways to carry out the method. The method described below can be carried out using the configurations illustrated in FIGS. 1-4, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S501.

At block S501, the cloud server 2 obtains the operation parameters of the at least one application 101 running in the foreground of the electronic device 1.

As described in blocks S3031 and S3033, the execution module 1003 sends the operation parameters of the at least one application 101 running in the foreground to the cloud server 2.

At block S502, the cloud server 2 stores a record of the operation parameters of the at least one application 101 according to a time of receiving the operation parameters.

In one embodiment, the cloud server 2 establishes a record of the operation parameters of the application 101 running in the foreground. For example, as shown in FIG. 7, in the record, the operation parameters of the application "A1" running in the foreground received at 2018/1/1 9:05 am are 1200 MHz, 55 degrees C., and 256 MB, and the operation parameters of the application "A1" running in the foreground received at 2.18/1/1 9:15 am are 1400 MHz, 45 degrees C., and 512 MB.

At block S503, the cloud server 2 calculates the optimal operation parameters of the at least one application 101 according to the record of operation parameters of the at least one application 101.

In one embodiment, the optimal operation parameters of the at least one application 101 are calculated according to an average value of the operation parameters according to the history of execution of the at least one application 101 running in the foreground of the electronic device 1, a largest value of the operation parameters according to the history of execution of the at least one application 101 running in the foreground of the electronic device 1, or a most frequent value of the operation parameters according to the history of execution of the at least one application 101 running in the foreground of the electronic device 1.

For example, as shown in FIG. 7, the optimal operation parameters of the application "A1" are calculated according to the average value according to the history of execution of the application "A1". Thus, the cloud server 2 calculates the optimal operation parameters of the application "A1" to be 1300 MHz, 50 degrees C., and 384 MB.

In one embodiment, the cloud server 2 periodically (such as every Sunday) calculates the optimal operation parameters. In other embodiments, the cloud server 2 calculates the optimal operation parameters after each time of receiving the operation parameters from the electronic device 1.

It should be understood that during a first time of running the application 101 in the electronic device 1, since the optimal operation parameters have not been calculated yet, the cloud server 2 does not provide the selection button 121 in block S3032 for selecting the optimal operation parameters.

In another embodiment, the optimal operation parameters may be calculated by the electronic device 1. Thus, in blocks S3031 and S3033, the execution module 1003 stores a record of the operation parameters of the at least one application 101 in the memory 10 of the electronic device 1. Correspondingly, blocks S501 and S503 are implemented by the execution module 1003.

Figure 8:
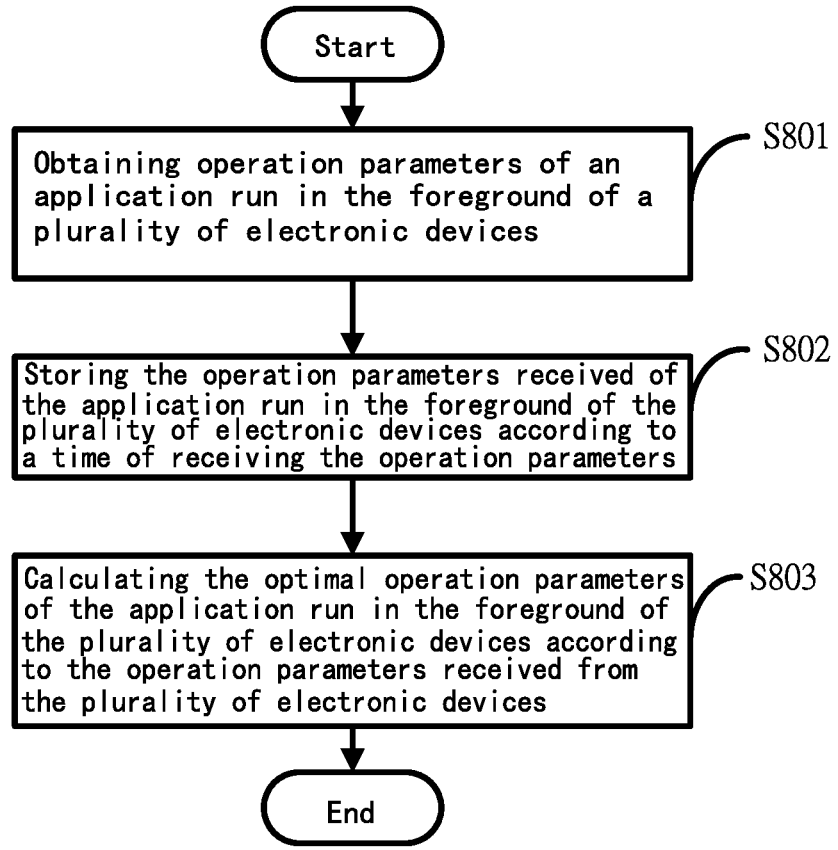
FIG. 8 is a flowchart of a method of calculating optimal operation parameters of an application according to another embodiment.

FIG. 8 illustrates a flowchart of a method of calculating optimal operation parameters of an application according to a second embodiment. The method is provided by way of example, as there are a variety of ways to carry out the method. The method described below can be carried out using the configurations illustrated in FIGS. 1-7, for example, and various elements of these figures are referenced in explaining the example method. Each block shown in FIG. 8 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S801.

At block S801, the cloud server 2 obtains operation parameters of the at least one application 101 running in the foreground of a plurality of electronic devices 1.

At block S802, the cloud server 2 stores the operation parameters received of the at least one application 101 running in the foreground of the plurality of electronic devices 1 according to a time of receiving the operation parameters.

At block S803, the cloud server 2 calculates the optimal operation parameters of the at least one application 101 running in the foreground of the plurality of electronic devices 1 according to the operation parameters received from the plurality of electronic devices 1.

In one embodiment, the optimal operation parameters of the application 101 are calculated according to an average value of the operation parameters according to the history of execution of the at least one application 101 running in the foreground of the plurality of electronic devices 1, a largest value of the operation parameters according to the history of execution of the at least one application 101 running in the foreground of the plurality of electronic devices 1, or a most frequent value of the operation parameters according to the history of execution of the at least one application 101 running in the foreground of the plurality of electronic devices 1.

For example, the optimal operation parameters of an application "B" is calculated according to the average value of the operation parameters according to the history of execution of the application "B" in the foreground of the plurality of electronic devices 1. The plurality of electronic devices 1 may include a first electronic device and a second electronic device.

For example, the cloud server 2 obtains the operation parameters of the application "B" from the first electronic device and the second electronic device. The record of the operation parameters in the first electronic device include the following: 2018/1/1 9:10 am, 1200 MHz, 55 degrees C., and 512 MB, 2018/1/5 9:30 am, 1400 MHz, 45 degrees C., 512 MB. The record of the operation parameters in the second electronic device include the following: 2018/1/2 9:20 am, 1300 MHz, 65 degrees C., and 512 MB.

According to the history of execution of the application "B" in the first electronic device and the second electronic device, the optimal operation parameters are calculated to be 1300 MHz, 55 degrees C., and 512 MB.

In this way, whenever any of the plurality of electronic devices 1 (such as the first electronic device) runs the application "B" in the foreground, the first electronic device obtains the optimal operation parameters from the cloud server 2.

In one embodiment, the cloud server 2 periodically (such as every Sunday) calculates the optimal operation parameters. In other embodiments, the cloud server 2 calculates the optimal operation parameters after each time of receiving the operation parameters from any one of the plurality of electronic devices 1.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An operation parameter configuration method comprising:
    configuring at least two groups of operation parameters of an application, the at least two groups of operation parameters comprising a group of default operation parameters and a group of optimal operation parameters;
    detecting a startup signal of the application in real time;
    confirming one of the at least two groups of operation parameters according to the startup signal of the application; and
    starting the application in a foreground of the electronic device according to one confirmed group of operation parameters;
    wherein, the group of optimal operation parameters is calculated according to a history of execution of the application in the foreground of the electronic device;
    wherein, when the startup signal of the application is detected to be a single touch signal, the application is executed in the foreground of the electronic device according to the group of default operation parameters; and
    when the startup signal of the application is detected to be a continual touch signal, the application is executed in the foreground according to the group of optimal operation parameters.

2. The operation parameter configuration method of claim 1, wherein the group of optimal operation parameters is calculated according to an average value of the operation parameters according to the history of execution of the application in the foreground of the electronic device, a largest value of the operation parameters according to the history of execution of the application in the foreground of the electronic device, or a most frequent value of the operation parameters according to the history of execution of the application in the foreground of the electronic device.

3. The operation parameter configuration method of claim 1 further comprising:
switching the application from the foreground to a background of the electronic device in response to a switching signal; and
running the application in the background according to a portion of the group of default operation parameters.

4. The operation parameter configuration method of claim 1 further comprising:
detecting an operation efficiency of the application when the application is running in the foreground of the electronic device; and
adjusting an operation parameter of one of the at least two groups of operation parameters of the application when the operation efficiency of the application is less than or equal to a predetermined value until the operation efficiency of the application is greater than the predetermined value.

5. The operation parameter configuration method of claim 1 further comprising:
sending the operation parameters of the application run in the foreground of the electronic device to a server.

6. The operation parameter configuration method of claim 5 further comprising:
obtaining, by the server, the operation parameters of the application running in the foreground of the electronic device;
storing the operation parameters of the application running in the foreground of the electronic device; and
calculating the group of optimal operation parameters according to the operation parameters of the application running in the foreground of the electronic device.

7. The operation parameter configuration method of claim 5 further comprising:
obtaining, by the server, the operation parameters of the application running in the foreground of a plurality of electronic devices;
storing the operation parameters of the application running in the foreground of the plurality of electronic devices; and
calculating the group of optimal operation parameters according to the operation parameters of the application running in the foreground of the plurality of electronic devices.

8. An electronic device comprising:
a processor; and
a memory storing a plurality of instructions, which when executed by the processor, cause the processor to:
configure at least two groups of operation parameters of an application, the at least two groups of operation parameters comprising a group of default operation parameters and a group of optimal operation parameters;
detect in a startup signal of the application real time;
confirm one of the at least two groups of operation parameters according to the startup signal of the application; and
start the application in a foreground of the electronic device according to one confirmed group of operation parameters wherein, the group of optimal operation parameters is calculated according to a history of execution of the application in the foreground of the electronic device;
wherein, when the startup signal of the application is detected to be a single touch signal, the application is executed in the foreground of the electronic device according to the group of default operation parameters; and
when the startup signal of the application is detected to be a continual touch signal, the application is executed in the foreground according to the group of optimal operation parameters.

9. The electronic device of claim 8, wherein the group of optimal operation parameters is calculated according to a history of execution of the application in the foreground of the electronic device.

10. The electronic device of claim 9, wherein the group of optimal operation parameters is calculated according to an average value of the operation parameters according to the history of execution of the application in the foreground of the electronic device, a largest value of the operation parameters according to the history of execution of the application in the foreground of the electronic device, or a most frequent value of the operation parameters according to the history of execution of the application in the foreground of the electronic device.

11. The electronic device of claim 8, wherein the processor is further configured to:
switch the application from the foreground to a background of the electronic device in response to a switching signal and run the application in the background according to a portion of the group of default operation parameters.

12. The electronic device of claim 8, wherein the processor is further configured to:
detect an operation efficiency of the application when the application is run in the foreground of the electronic device; and
adjust an operation parameter of one of the at least two groups of operation parameters of the application when the operation efficiency of the application is less than or equal to a predetermined value until the operation of the application is greater than the predetermined value.

13. The electronic device of claim 8, wherein the processor is further configured to:
send the operation parameters of the application running in the foreground of the electronic device to a server.

14. The electronic device of claim 13, wherein the processor is further configured to:
obtain, by the server, the operation parameters of the application running in the foreground of the electronic device;
store the operation parameters of the application running in the foreground of the electronic device; and
calculate the group of optimal operation parameters according to the operation parameters of the application running in the foreground of the electronic device.

15. The electronic device of claim 13, wherein the processor is further configured to:
obtain, by the server, the operation parameters of the application running in the foreground of a plurality of electronic devices;
store the operation parameters of the application running in the foreground of the plurality of electronic devices; and calculate the group of optimal operation parameters according to the operation parameters of the application running in the foreground of the plurality of electronic devices.

16. A non-transitory storage medium having stored thereon instructions that, when executed by at least one processor of an electronic device, causes the least one processor to execute instructions of an operation parameter configuration method for configuring operation parameters of an application, the method comprising:
   configuring at least two groups of operation parameters of an application, the at least two groups of operation parameters comprising a group of default operation parameters and a group of optimal operation parameters;
   detecting a startup signal of the application in real time;
   confirming one of the at least two groups of operation parameters according to the startup signal of the application; and
   starting the application in a foreground of the electronic device according to one confirmed group of operation parameters; wherein the group of optimal operation parameters is calculated according to a history of execution of the application in the foreground of the electronic device;
   wherein, when the startup signal of the application is detected to be a single touch signal, the application is executed in the foreground of the electronic device according to the group of default operation parameters; and
   when the startup signal of the application is detected to be a continual touch signal, the application is executed in the foreground according to the group of optimal operation parameters.

17. The operation parameter configuration method of claim 1, wherein the group of optimal operation parameters comprises a processing frequency, a maximum temperature, and a maximum storage space.

18. The electronic device of claim 8, wherein the group of optimal operation parameters comprises a processing frequency, a maximum temperature, and a maximum storage space.

19. The non-transitory storage medium of claim 16, wherein the group of optimal operation parameters comprises a processing frequency, a maximum temperature, and a maximum storage space.

* * * * *